Nov. 18, 1969  D. T. ROBERTS  3,479,230

WELDING FLUX FOR NODULAR CAST IRON

Filed Dec. 5, 1966

INVENTOR
Dan T. Roberts

BY *[signatures]*

ATTORNEYS

United States Patent Office 3,479,230
Patented Nov. 18, 1969

3,479,230
WELDING FLUX FOR NODULAR CAST IRON
Dan T. Roberts, Corsicana, Tex., assignor to Iron City
Iron Works, Corsicana, Tex., a corporation of Texas
Filed Dec. 5, 1966, Ser. No. 599,159
Int. Cl. B23k 35/36
U.S. Cl. 148—24                                    5 Claims

ABSTRACT OF THE DISCLOSURE

Method and materials for welding nodular cast iron including melting nodular iron filler metal having substantially the same characteristics as the parent metal in the presence of a flux of defined proportions including cerium, calcium, silicon, magnesium, and borax to provide a weld transition zone of nodular iron.

This invention relates to a method and materials for welding and more particularly relates to a method and materials for welding nodular cast iron.

It is an object of this invention to provide a new and improved method and materials for welding.

It is a particularly important object of this invention to provide a new and improved method for welding nodular or ductile cast iron.

It is still another object of the invention to provide a method for welding nodular cast iron wherein the filler metal and the transition zone between the parent and filler metals possess the same characteristics as the parent metal of the welded member.

It is another object of the invention to provide a method of welding nodular cast iron which includes steps of heating a welding rod of predetermined characteristics and the parent metal to be welded to a temperature within a predetermined range, adding a welding flux in a predetermined amount to the heated zone including the welding rod metal and the metal being welded until the desired amount of filler metal has been added in the zone being welded, and thereafter cooling the welded zone.

It is another object of the invention to provide a method of welding nodular cast iron including steps of using a welding rod cast of the same or substantially the same nodular cast iron as the metal being welded and which is ferritized by heating to about 1600 degrees F., furnace cooling to about 1275 degrees F., and holding the rod at such temperature for about 2 hours, thereafter cooling at a controlled rate of no more than about 40 degrees F. per hour to a temperature of about 1000 degrees F., and thereafter machining the surface of the rod to remove impurities prior to use.

It is still another object of the invention to provide a method of welding nodular cast iron including the step of melting a nodular cast iron welding rod in the presence of a flux comprising cerium, calcium, silicon, aluminum, magnesium, and borax.

It is a further object of the invention to provide a welding rod for welding nodular cast iron formed by casting nodular iron in a desired shape, ferritizing the iron by heating to about 1600 degrees F., furnace cooling the iron to about 1275 degrees F., maintaining the iron at about 1275 degrees F. for about 2 hours, further cooling the iron at a controlled rate of no more than about 40 degrees F. per hour to a temperature of about 1000 degrees F., subsequently cooling to atmospheric temperature, and machining the surface of the iron to remove impurities.

It is another object of the invention to provide a method of making a ferritized nodular iron welding rod.

It is another object of the invention to provide a flux for welding nodular cast iron comprising cerium, calcium, silicon, magnesium, and borax.

It is still another object of the invention to provide a preferred alloy or flux for welding nodular cast iron comprising cerium, calcium, silicon, magnesium, aluminum, rare earth, borax, and iron.

Additional objects and advantages of the invention will be readily apparent from the reading of the following description of a device constructed in accordance with the invention, and reference to the accompanying drawings thereof, wherein.

Nodular cast iron, sometimes referred to as ductile iron or spheroidal graphite cast iron, is a high carbon content material well known for its favorable mechanical properties. Unlike ordinary cast iron, nodular iron has superior tensile strength with a ductility substantially greater than that of conventional cast irons. Nodular iron comprises a continuous iron matrix in which globules or sphere-like bodies of graphite are embedded and distributed substantially uniformly. In welding nodular iron, a reversion of the graphite to a flake form may occur due to an instability of the nodularizing elements when the chemical balance of the material is affected. Also, in the absence of graphitizing elements carbides may be formed.

A welding process embodying the invention includes simultaneously heating both the parent metal of the welded member and a weld rod of nodular cast iron prepared in a prescribed manner to a predetermined temperature range, introducing a special alloy or flux material into the molten parent and filler metals and cooling the welded member.

Figure 5:
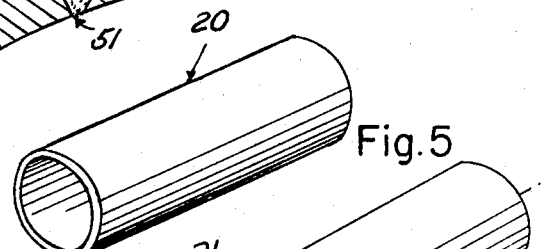
FIGURE 5 is a fragmentary view in perspective of a preferred form of casting of nodular iron from which welding rods are formed according to the invention.

It is particularly important that the welding process be carried out with the filler metal in the form of welding rods which in one form are preferably prepared as schematically illustrated in part by FIGURES 5-8. Initially, nodular cast iron having an analysis substantially that of the parent metal nodular iron is cast in the form of a tubular member 20 as shown in FIGURE 5. A typical nodular cast iron suitable for the welding rods has the following composition by weight in addition to iron:

| | Percent |
|---|---|
| Total carbon | 3.50 |
| Silicon | 2.70 |
| Manganese | 0.50 |
| Phosphorus | ≦0.05 |
| Sulphur | ≦0.02 |
| Retained magnesium | 0.03 |

The nodular cast iron member 20 has a circumference substantially equal to the length of the welding rods to be formed from the member. For example, the member may be of substantial size, such as about 12 inches in diameter with a wall thickness of about ⅜ inch. After casting, the tubular member 20 is "ferritized" by furnace heating to a temperature of about 1600 degrees F., furnace cooling to a temperature of about 1275 degrees F., holding at 1275 degrees F. for about 2 hours, further cooling at a controlled rate of no more than about 50 degrees F. per hour to a temperature of about 1000 degrees F. The cooling of the cast member from 1600 to 1275 degrees is effected in the furnace in which the member is heated by either cutting off or reducing the input to the furnace. The cooling is slow though not at a controlled rate. Air quenching in this stage is not desirable. From 1275 to 1000 degrees the furnace is cooled by controlled fuel input reduction. When a gas fired atmospheric furnace is used the atmosphere in the furnace is a reducing or non-oxidizing one since the oxygen is consumed more rapidly than its feed rate to the furnace. The character of the atmosphere in the furnace is not critical, however, and an electric furnace may be employed, if desired. The member is then cooled to room temperature under atmospheric conditions.

Figure 7:
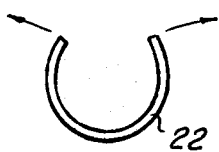
FIGURE 7 is a perspective view illustrating a further intermediate phase in the formation of one of the welding rods; and, FIGURE 8 is a perspective view showing a preferred final form of the welding rod.
Figure 6:
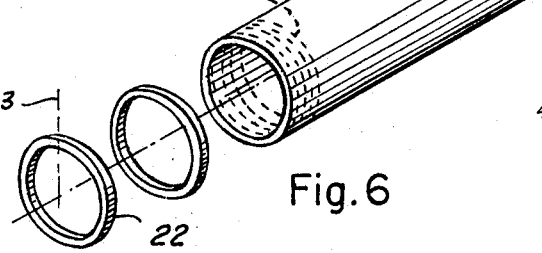
FIGURE 6 is an exploded view in perspective illustrating an intermediate phase in the formation of the welding rods from the casting shown in FIGURE 5.
Figure 8:
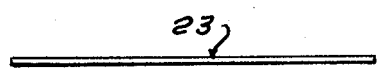

The tubular member 20 is then thoroughly machined over both its inside and outside surfaces to a depth sufficient to remove all surface impurities. The tubular member is then cut along planes denoted by the broken lines 21 at substantially equally spaced intervals perpendicular to its longitudinal axis providing a plurality of rings 22. Each of the rings is then cut or split along a single radial plane indicated by the broken line 23 in FIGURE 6. The split ring 22 is then spread and straightened as indicated in FIGURE 7 until it is substantially straight providing a weld rod 23 as represented in FIGURE 8. The weld rod thus comprises a bar or rod of nodular cast iron which has been ferritized and machined. The ferritizing converts combined carbon in the metal of the rod to graphitic carbon which goes more slowly into solution during the welding process than combined carbon. By retarding the solution of the carbon in the welding rod there is less tendency for such carbon to revert to the carbide form during the cooling of the weld zone. Carbides are not desired due to their hardness which reduces the machineability of cast iron.

The use of the tubular casting 20 for making the welding rods is particularly preferred due to the ease of machining the inside and outside surfaces of the tubular form. If desired, the rods may be made from cast sheet material, wire-like shapes, and others which are ferritized and then machined.

In the welding process the welding rod 23 is melted along with parent metal in the presence of an alloy or flux of the following proportions by weight percent:

| | Percent | |
|---|---|---|
| | Minimum | Maximum |
| Magnesium | 1.50 | 2.50 |
| Silicon | 30.00 | 50.00 |
| Calcium | 10.00 | (1) |
| Cerium | 0.25 | 4.00 |
| Borax | 20.00 | 30.00 |

¹ Not critical.

While the above identified constituents of the flux are readily mixed in their pure forms in the percentages noted, several of them are available in less expensive non-pure commercial forms. For example, the cerium may be obtained as a "rare earth fluoride" comprising cerium, rare earth, and fluorine. The rare earth and fluorine neither enhance nor impede the functioning of the cerium with which they are combined in the flux. Also, calcium, silicon, and aluminum are obtainable together in an alloy form generally at less cost than obtaining the calcium and silicon each in pure form.

It is essential, however, that the magnesium be in an alloy form with the silicon, as magnesium in its pure state is not sufficiently stable to be subjected to the heating of the welding process. For example, the magnesium preferably is generally added in the form of "5% magnesium ferrosilicon."

The coaction between these several flux ingredients permits the heating, mixing, and cooling to a solid state of both the parent and weld metals so that the delicate balance of the metals is not disturbed causing carbon formations and effecting the retention of the nodule form of graphite in the iron of both parent and weld metals upon solidification. Slags formed rise to the surface so that they are readily removed in final dressing and do not affect the homogeneous structure of the nodular cast iron.

A particularly preferred flux composition which is readily formulated and most flexible in its functioning in the welding process of the invention has substantially the following analysis by weight:

| | Percent |
|---|---|
| Magnesium | 2.08 |
| Silicon | 36.00 |
| Calcium | 16.00 |
| Cerium | 0.80 |
| Aluminum | 1.20 |
| Other rare earths | 6.17 |
| Borax | 20.00 |
| Iron, substantially the balance. | |

The iron is included in alloy form with one or more of the other ingredients while the silicon similarly is in alloy form with several of the ingredients.

Another operable specific flux composition which has been used has substantially the following analysis by weight:

| | Percent |
|---|---|
| Magnesium | 2.50 |
| Silicon | 41.00 |
| Calcium | 10.00 |
| Cerium | 0.25 |
| Aluminum | Trace |
| Other rare earths | Trace |
| Borax | 30.00 |
| Iron, substantially the balance. | |

The flux materials are ground or crushed to a fine uniform consistency for most efficient handling by a preferred form of welding torch, discussed below, and to produce a weld of maximum density. The ground flux materials may be as large as about 140 mesh size and preferably do not exceed about 200 mesh size.

Figure 3:
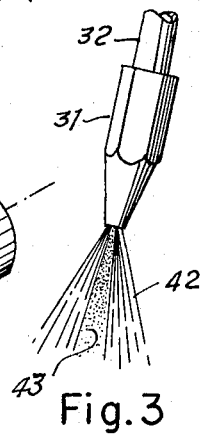
FIGURE 3 is an enlarged fragmentary view in perspective schematically illustrating the jetting action of the welding torch nozzle introducing the flux into the melted filler and parent metals.

It is preferred that the flux be "jetted" into the molten parent and weld metals to most effectively mix the flux with the metals. Such jet action is achieved with a welding torch 30, schematically illustrated in FIGURE 1, from which the flux flows as a stream enveloped by a gas mixture such as oxygen and acetylene which burns to provide the necessary heat. The torch includes a nozzle 31 on a tube 32 supported from a handle asembly 33 which has a gas and flux mixer valve 34 and is supplied with oxygen and acetylene through lines 35 and 40. A handle or lever 33a actuates the mixer valve to allow flux to be drawn into the gas stream flow through the torch. A cartridge 41 connected with the mixer valve 34 contains the powdered flux which is drawn by an aspirator effect through the valve into the stream of gas passing from the supply lines 35 and 40 through the handle and valve into the tube 32. The gas along with the stream of flux is directed by the nozzle 31 into the molten parent and weld metals. As shown in FIGURE 3, the gas 42 generally envelopes a concentrated stream of flux 43 which due to its greater density is less divergent than the exiting gas and is forced more deeply into maximum intimate contact with the molten metals. An example of a preferred form of welding torch which is commercially available is the "Eutalloy" torch illustrated in a booklet entitled Process Manual, 1963, EU/PMJ3, published by the Eutectic Welding Alloys Corporation, Flushing, N.Y., manufacturers and distributors of the torch.

Figure 1:
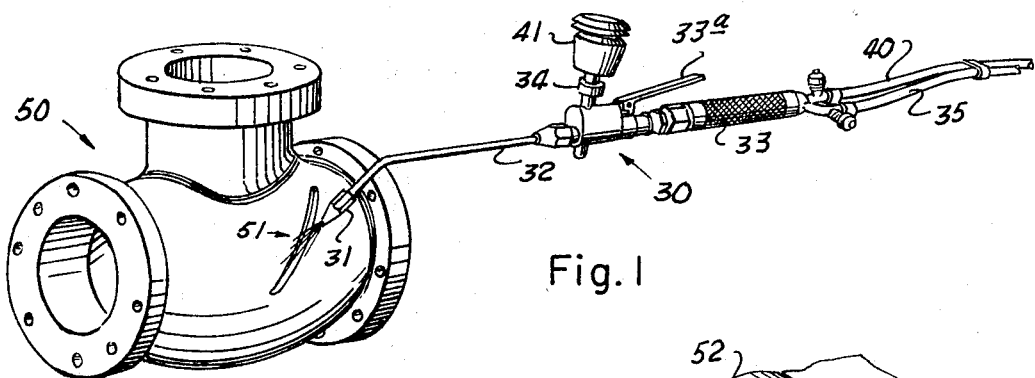
FIGURE 1 is a view in perspective illustrating an initial phase of welding a nodular iron casting in accordance with the invention.
Figure 2:
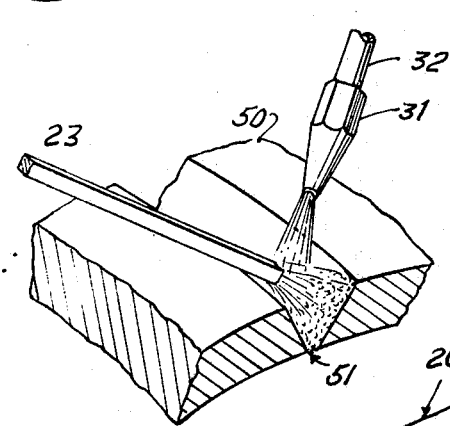
FIGURE 2 is a fragmentary view in perspective of a succeeding phase of welding the casting during which a welding rod and the parent metal of the casting are melted in the presence of a flux.
Figure 4:
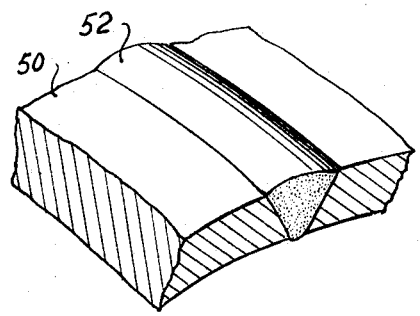
FIGURE 4 is a fragmentary view in perspective showing a completed weld in the casting prior to final dressing of the welded member.

The welding process is carried out in steps illustrated diagrammatically in FIGURES 1, 2 and 4. If the welded member, such as a casting 50, is so shaped that it has local stresses in it at atmospheric temperature, the area of the member to be welded is preheated by the welding torch 30 to a temperature of about 600 degrees F. to relieve such stresses. If the parent metal is in a member, such as sheet material, having no local stresses, preheating is not required. After preheating, if necessary, the welding rod 23 and the welding torch 30 are held by the operator with an end of the rod and the nozzle of the torch at relative positions at which the rod end and the parent metal in the zone to be welded are enveloped by the flame from the torch. The burning gas stream 42 from the torch simultaneously heats the parent metal and the welding rod melting the rod into the weld area 51 until the rod and parent metal are at a temperature range of about 2000–2500 degrees F. when the flux is introduced through the torch into the molten metal mixture by depressing the lever 33a. The operator controls the quantity of flux injected into the weld zone and its distribution therein. The torch nozzle is manipulated over the weld area to distribute the flux substantially evenly while it is held at a distance from the molten metal so that the stream of flux 43 is jetted somewhat deeply into the molten metal zone. The flux is introduced in a quantity ranging from a minimum of about fifteen percent (15%) flux to weld metal melted into the welded zone. The ratio of flux added to the weld metal melted with the parent metal is within the control of the operator and related to the adjustment of the rate of flow of the flux from its cartridge 41 into the stream of gas passing through the torch. Obviously, the longer the torch is held at a given location with the valve 34 being held open by the operator the greater the quantity of flux mixed with the weld and parent metals. The weld rod and torch are simultaneously manipulated along the weld zone 51 until the entire zone has been preferably slightly over-filled with weld metal to produce a weld 52, FIGURE 4. After the weld is completed, the heating of the parent metal and weld metal and welding rod is terminated and the welded member is cooled either under controlled conditions or under atmospheric conditions.

When the welded member is cool the weld zone is suitably machined or otherwise dressed to provide the desired surface finish. The weld zone of the member may be heat treated as required, depending upon the intended use of the member. If heat treated, such procedure is carried out in the same manner as heat treating of the parent metal since the weld metal added during the welding process possesses the same characteristic as the original parent metal. It is to be particularly noted, however, that heat treating is not a requisite for the weld metal added during the welding process to possess the same characteristics as the adjoining parent metal.

Typical members welded in accordance with the invention have been cut and examined along surface portions of the inner structure of the members including the parent metal of the welded member, the transition zone between the parent and weld metals, and the weld metal itself. Over each of the several surface areas examined substantially identical physical characteristics were observed along both untreated surface portions and surface portions etched with a 2% Nital solution. Each of the surface portions showed a homogeneous structure comprising substantially evenly distributed nodules of graphite in a continuous phase of a pearlitic iron matrix. While substantially the same percentage of graphite was present in the weld metal as in the parent metal in the surface portions examined a slightly larger number of slightly smaller nodules were observed over such areas in those samples of the weld metal than in the parent metal, apparently because the cooling rate within the weld area was somewhat more rapid than the cooling rate of the parent metal of the welded member at the time of its initial casting. It is well known in the metallurgy art that variations in cooling rates of nodular iron produce slight variations in the graphite nodule size and number while not affecting the physical characteristics of such nodular iron such as its strength and ductility. Such slight variations are observable only when the surface area portions are observed under substantial optical magnification.

Test specimens of welded members have been examined both in parent and weld metal zones with substantially identical results being obtained in both the weld and parent metals with respect to the following physical characteristics: tensile strength, yield point, elongation, and Brinell hardness. For example, in one sample, the tensile strength of the parent metal was measured at 62,400 pounds per square inch, while the tensile strength of the weld metal was 62,800 pounds per square inch. Similarly, the yield point of the parent metal was found to be 46,100 pounds per square inch, while the yield point of the weld metal was 45,350 pounds per square inch.

Due to the favorable physical characteristics of the weld performed with the process, a welded member is machined and otherwise finished so that the weld is not detectable and the member functions as though no weld had been made.

It will now be seen that a new and improved method and materials for welding have been described and illustrated.

It will be further seen that a new and improved method and materials for welding nodular cast iron have been described and illustrated.

It will be further seen that a new and improved welding rod for use in a method of welding nodular cast iron has been described and illustrated.

It will also be seen that a method of making a ferritized nodular iron welding rod is described and illustrated.

It will also be seen that a new and improved flux or alloy used in a method of welding nodular cast iron has been described and illustrated.

It will be further seen that the method of welding produces a weld metal and a transition zone between the parent and weld metals having the same physical and visual characteristics as the parent metal of the welded member.

It will also be seen that the method of welding includes heating a welding rod of predetermined characteristics and the parent metal of the welded member to a temperature within a predetermined range, adding a welding flux of predetermined content in the heated zone for mixing with the filler and parent metals, mixing the flux and filler and parent metals until a desired amount of filler metal has been added to the parent metal, and cooling the welded member to atmospheric temperature.

It will be further seen that the welding method includes the step of adding filler metal from a welding rod cast from the same nodular cast iron as the parent metal of the welded member, such welding rod having been ferritized by heat treating to a temperature preferably within the range of about 1600 degrees F., furnace cooled to about 1275 degrees F., maintained at about 1275 degrees F. for about two hours, and further cooled at a controlled rate of no more than 40 degrees per hour to a temperature of about 1000 degrees F., cooled to atmospheric temperature, and subsequently machined to remove surface impurities.

It will be further seen that the welding method also includes melting the nodular cast iron welding rod and the nodular cast iron parent metal in the presence of a flux comprising cerium, calcium, silicon, magnesium, and borax.

It will be further seen that a preferred form of the flux comprises cerium, silicon, magnesium, calcium, aluminum, other rare earths, borax, and iron.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A welding flux comprising:

| | Percent by weight |
|---|---|
| Magnesium | 1.50 to 2.50 |
| Silicon | 30.00 to 50.00 |
| Calcium | ≧10.00 |
| Cerium | 0.25 to 4.00 |
| Borax | 20.00 to 30.00 |

2. A welding flux comprising:

| | Percent by weight |
|---|---|
| Magnesium | 2.08 |
| Silicon | 36.00 |
| Calcium | 16.00 |
| Cerium | 0.80 |
| Aluminum | 1.20 |
| Other rare earths | 6.17 |
| Borax | 20.00 |

Iron, substantially the balance.

3. A welding flux comprising:

| | Percent by weight |
|---|---|
| Magnesium | 2.50 |
| Silicon | 41.00 |
| Calcium | 10.00 |
| Cerium | 0.25 |
| Aluminum | Trace |
| Other rare earths | Trace |
| Borax | 30.00 |

Iron, substantially the balance.

4. A welding flux as defined in claim 1 wherein said ingredients are ground into granules having a mesh size less than about 140.

5. A welding flux as defined in claim 1 wherein said ingredients are ground into granules having a mesh size no greater than about 200.

References Cited
UNITED STATES PATENTS

| | | | |
|---|---|---|---|
| 1,315,611 | 9/1919 | Siever | 148—24 |
| 1,905,081 | 4/1933 | Woods | 148—24 |
| 2,770,871 | 11/1956 | Demalander | 29—196.1 |
| 2,900,490 | 8/1959 | Petruck et al. | 148—26 |
| 3,372,057 | 3/1968 | Seifahrt | 148—26 |

L. DEWAYNE RUTLEDGE, Primary Examiner

T. R. FRYE, Assistant Examiner

U.S. Cl. X.R.

29—196.1, 496; 75—134

UNITED STATES PATENT OFFICE
CERTIFICATE OF CORRECTION

Patent No. 3,479,230                        November 18, 1969

Dan T. Roberts

It is certified that error appears in the above identified patent and that said Letters Patent are hereby corrected as shown below:

In the heading to the printed specification, lines 3 and 4, "assignor to Iron City Iron Works, Corsicona, Tex., a corporation of Texas" should read -- assignor to Oil City Iron Works, Corsicana, Tex., a corporation of Texas --.

Signed and sealed this 27th day of October 1970.

(SEAL)
Attest:

Edward M. Fletcher, Jr.                        WILLIAM E. SCHUYLER, JR.
Attesting Officer                                Commissioner of Patents